Aug. 18, 1959   H. W. UMSTADTER   2,900,200
PACKED SLEEVE COUPLING FOR FLARED CONDUITS
Filed Nov. 4, 1954   3 Sheets-Sheet 2

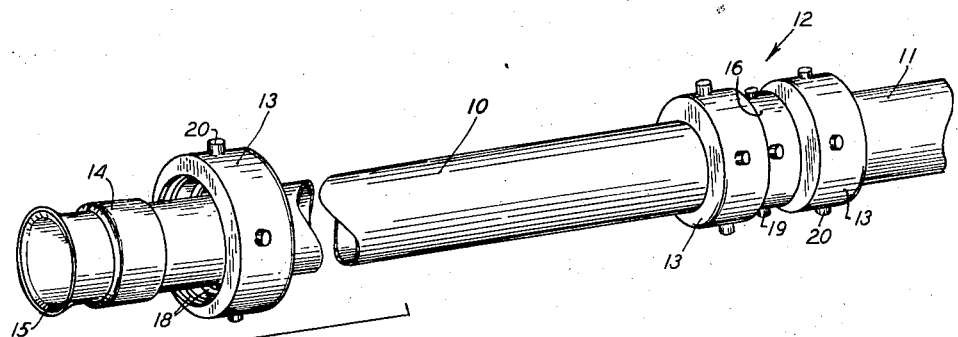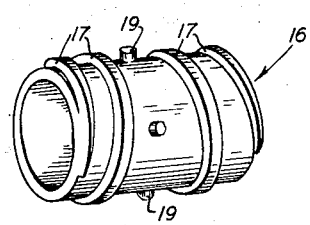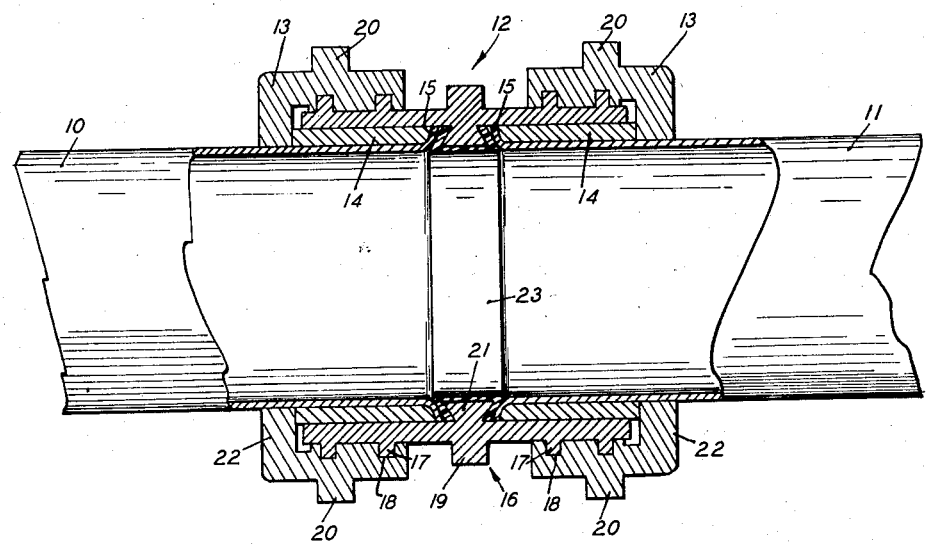

INVENTOR.
HAROLD W. UMSTADTER
BY
*Buckhorn and Cheatham*
ATTORNEYS

United States Patent Office 2,900,200
Patented Aug. 18, 1959

2,900,200

PACKED SLEEVE COUPLING FOR FLARED CONDUITS

Harold W. Umstadter, Long Valley, N.J., assignor to American Portable Irrigation Co., Philadelphia, Pa., a corporation of Delaware Application November 4, 1954, Serial No. 466,781

1 Claim. (Cl. 285—332.3)

The present application is a continuation-in-part of my copending application Serial No. 454,415, filed September 7, 1954, now abandoned.

The present invention relates to a conduit for fluids, especially liquids. The present invention is especially useful for the transportation of petroleum and petroleum products, such as gasoline and oils. It is also of great utility in the transportation of water for irrigation or domestic consumption.

A particular object of the present invention is to provide means whereby long conduits may be rapidly created, especially for temporary use in the provisioning of advancing armies with petroleum products, or other liquids such as water, and for use in supplying petroleum products or water to communities or districts whose normal sources of supply have been disrupted by enemy action, floods or other disasters.

In spite of the foregoing temporary or emergency uses of the present invention, it is to be appreciated that the invention is also of utility in peaceful pursuits, such as supplying water to construction projects, field irrigation, and other purposes wherein a lightweight, quickly assembled or disassembled conduit of relatively large diameter may be found desirable.

The present invention is specially characterized by its light weight, the conduit comprising sections of thin-walled pipe which is preferably formed of aluminum or aluminum alloys having considerable strength and resistance to bursting under normally encountered pressures and which are readily available in sizes ranging from about two inches to about eight inches, and in lengths ranging from about twenty feet to about forty feet. Such thin-walled pipes are widely used in field irrigation at the present time, but for the most part are coupled together by means of flexible couplers whereby one pipe section may assume various angular relationships with respect to adjoining pipe sections. The present invention is distinguished from such previous systems in that the means for coupling two pipe sections together forms a rigid, nonflexible joint, and bending of the conduit to follow the contours of the ground and to pass around obstructions is usually provided by the inherent flexibility of the pipe sections between couplings. For most purposes the pipe sections, which may bend several feet in a length of twenty or thirty feet, depending upon the diameter of the pipe, without distorting the pipe at any point, provide sufficient flexibility. In certain situations, such as in laying pipelines through cities or over cliffs and the like, special elbows may be provided. However, since the coupling means of such special fittings would be exactly the same as for the normal joint, they are not herein illustrated.

A further object of the present invention is to provide a coupling which is easily formed, such as by automatic, pressure-casting machinery, which may be formed of lightweight material such as aluminum or aluminum alloy and have great strength, which is easily and quickly operated to connect pipe sections together, and in which smaller components are so affixed to larger components that they may not be lost in the field.

A further object of the present invention is to provide a conduit comprising sections of pipe, both ends of which are the same, so that there is no necessity for orienting adjacent pipes by turning them end for end so as to be able to slip an end of one into a bell on another.

The foregoing and other objects and advantages of the present invention will be more readily apparent from inspection of the accompanying drawings, taken in connection with the following specification, wherein several preferred embodiments of the present invention are illustrated and described, and in which like numerals refer to like parts throughout.

In the drawings,

Fig. 1 is a view in perspective, partially broken away, of a section of conduit formed in accordance with the present invention, two sections of pipe being illustrated as joined together in accordance with the present invention, and the end of one section being illustrated as in readiness to be joined to a succeeding section of pipe;

Fig. 2 is a view in perspective of the coupling sleeve;

Fig. 3 is a view showing two pipe ends joined together by a coupling, the coupling being illustrated in section along a diametrical plane;

Figure 4:
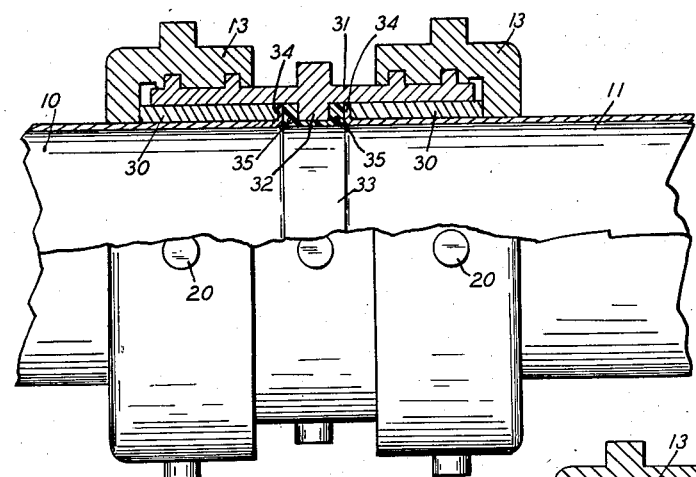
Figs. 4, 5 and 6 are views illustrating two pipe sections joined together by modified forms of couplings, the couplings being partially broken away along radial planes.

Referring to Figs. 1, 2 and 3, there are illustrated two pipe sections 10 and 11 joined together by a coupling 12, with part of a coupling comprising a gland nut 13 and a follower ring 14 mounted on the free end of pipe section 10 and retained thereon by an end flange 15. Each pipe section permanently retains a pair of oppositely facing gland nuts 13 and follower rings 14, the same being retained on the pipe section by the flanges 15 at each end thereof. Thus, when the adjacent ends of a pair of pipe sections are inserted into the opposite ends of a coupling sleeve 16 and the gland nuts tightened onto the opposed ends of the sleeve 16, a conduit will be rapidly formed. It will be readily apparent that crews of workmen may transport the sections, dropping them end to end without regard to orientation thereof, and that a single man or men carrying a supply of coupling sleeves may rapidly join the sections together to form the conduit, spending a matter of seconds on each joint rather than minutes as in the best previous constructions of which applicant is aware.

It will be apparent from inspection of Figs. 2 and 3 that the coupling sleeve 16 comprises a cylindrical body, externally threaded on its opposite ends, the threads, indicated at 17, preferably comprising standard, square, quick-lead threads, and that the outwardly facing open ends of the gland nuts 13 are provided with matching internal threads 18. Preferably the sleeve is provided with a central, circumferentially extending row of spaced lugs 19 and the gland nuts are provided with similar lugs 20 for engagement by hook spanners or the like, such lugs being easily formed, requiring but little metal, and quickly engageable by tools of known type. The use of tools may be omitted for farm irrigation purposes, but it is preferable that the tools be used to tighten the joint when the conduit is to transport valuable or dangerous liquids, or when it is used to transport liquids such as water which must not be contaminated from outside sources.

The sleeve 16 is elongated, cylindrical, and is provided with a central, coaxial rib 21 extending about the interior thereof, the opposite sides of the rib being angularly undercut. The end flanges 15 on the pipe sections are flared outwardly, such flanges being easily formed by means of flaring tools or spinning devices, and the flanges extend outwardly for the most part at the same angle of inclination as the side faces of the rib 21. The outer rims of the flanges may be turned back slightly so as to have greater inclination than the sides of the rib. Each of the follower rings is preferably of such length as to extend beyond the end of the coupling sleeve when the joint is tightened, and each of the follower rings is of such internal diameter as snugly to surround the pipe section, and of such external diameter as snugly to slide into the open end of the sleeve. Each of the gland nuts is provided with an end flange 22, the internal diameter of which is such that the gland nut snugly embraces the pipe section, whereby the flange engages behind the outer end of the follower ring and forces it inwardly upon tightening of the gland nut.

A gasket 23 formed of elastomeric material, such as neoprene, is permanently mounted upon the rib 21. The gasket has an internal diameter substantially equal to the internal diameter of the pipe section and an external diameter substantially equal to the internal diameter of the sleeve 16, and is provided with a large peripheral groove, which snugly receives the rib 21 whereby the gasket is permanently clinched to the coupling sleeve. The gasket may be formed of natural rubber, but is preferably formed of any of the artificial rubbers which are resistant to corrosive action and deterioration or cracking under temperature changes, and the gasket material has sufficient hardness so that it will not readily become disengaged. The gasket must be deformable to the extent that it may be collapsed, inserted into the coupling sleeve, and snapped onto the central rib. The gasket should have a sufficient amount of elasticity that it will be compressed upon firm tightening of the gland nuts. The sides of the gasket, which engage the side walls of the rib, are preferably thicker than the inner portion of the gasket engaging the inner face of the rib, thereby facilitating engagement of the gasket with the rib and providing a large amount of material which may be deformed into the undercut grooves in the side walls of the rib to form a leakproof joint. While the contiguous faces of the follower ring 14, the flange 15, the gasket 23, and the rib 21, are generally parallel so that firm sealing contact may be accomplished, the outer rim of the flange 15 is preferably turned back slightly so that it will not cut into the gasket and so as to provide a slight space for reception of the displaced portion of the gasket created by firm tightening of the gland nut, further to insure tight sealing of the joint and to provide a bead to prevent loosening of the gasket. The construction is such that the tube ends are held firmly in coaxial relation to each other without danger of collapsing the thin walls in the region of the joint, any curvature in the conduit being accomplished by the inherent flexibility of the pipe sections between joints, or by special elbows or other fittings.

In Fig. 4 a pair of pipe sections 10 and 11 are shown as mounting a pair of gland nuts 13, identical to those previously described, and a pair of modified follower rings 30 similar to those previously described but provided with inner end surfaces extending substantially radially with respect to the axes of the pipe sections. These end rings cooperate with a modified coupling sleeve 31 having a modified internal rib 32 which is substantially rectangular in section, and a modified gasket 33 having a substantially rectangular groove formed therein. In this case the end flanges 34 on the pipe sections extend radially outward with respect to the axes of the pipe, therefore all of the contiguous surfaces of the follower rings, flanges, the gasket and the rib are parallel throughout. It is preferred, with such construction, that the gasket be provided with a pair of reinforcing rings 35 imbedded therein adjacent the inner surface of the gasket at each end thereof. These rings not only tend to hold the gasket in position, but prevent displacement of the gasket inwardly upon tightening of the gland nuts.

Figure 5:
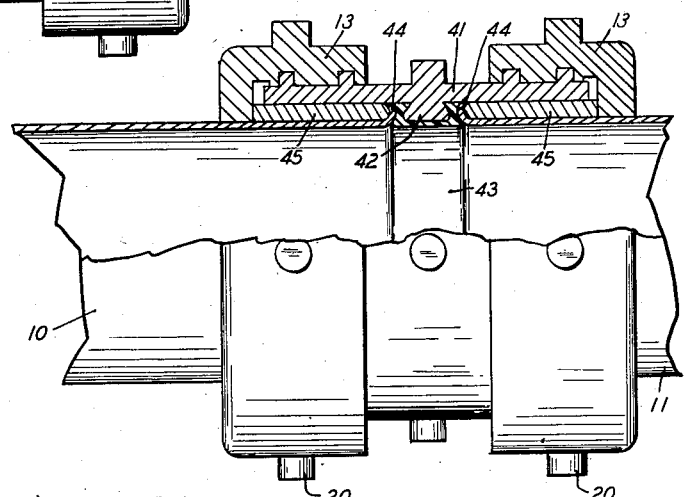

In Fig. 5 a similar construction is illustrated, the pipe sections mounting identical gland nuts 13 as before, which are engageable with a modified coupling sleeve 41. In this instance the sleeve is provided with a rib 42 having undercut side surfaces and rounded inner edges, reducing the possibility of the gasket 43 being damaged by excessive pressures. The pipe ends are provided with rounded flanges 44 which turn back at their outer edges in order to provide more rigid flanges which may be more positively driven into seating engagement by modified follower rings 45 having their forward ends rounded to fit within the rounded flanges. The gasket 43 is provided with a peripheral groove conforming to the shape of the rib 42 and is provided with annular grooves in its end faces conforming to the exterior surfaces of the flanges 44 whereby the gasket is more firmly locked in position.

Figure 6:
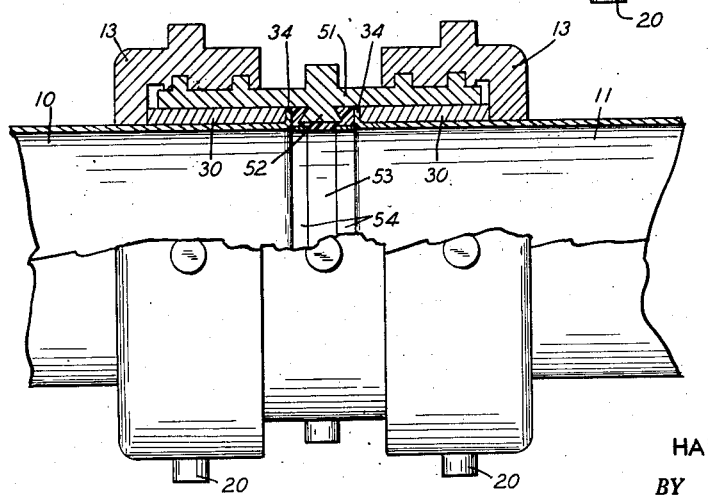

In Fig. 6 a modification is illustrated wherein the gland nuts engage follower rings 30 having squared ends which are pressed against radially extending flanges 34 on the pipe ends. The coupling sleeve 51 in this instance is provided with an undercut rib 52 which is of such depth that the portion of the gasket 53 lying against the inner face of the rib may be of slightly greater thickness than previously illustrated, and the gasket is bonded to a pair of reinforcing rings 54 formed of strips of metal shaped into ring shape and welded together at their ends. The reinforcing rings 54 underlie the gaps between the ends of the pipes and the adjacent corners of the rib 52 and prevent inward extrusion of the gasket under extreme pressures. In this instance the gasket may be provided with radially extending end walls so as to provide a large amount of material which is firmly pressed into the undercut area of the rib to provide a leakproof joint which will withstand extreme pressures.

Figure 7:
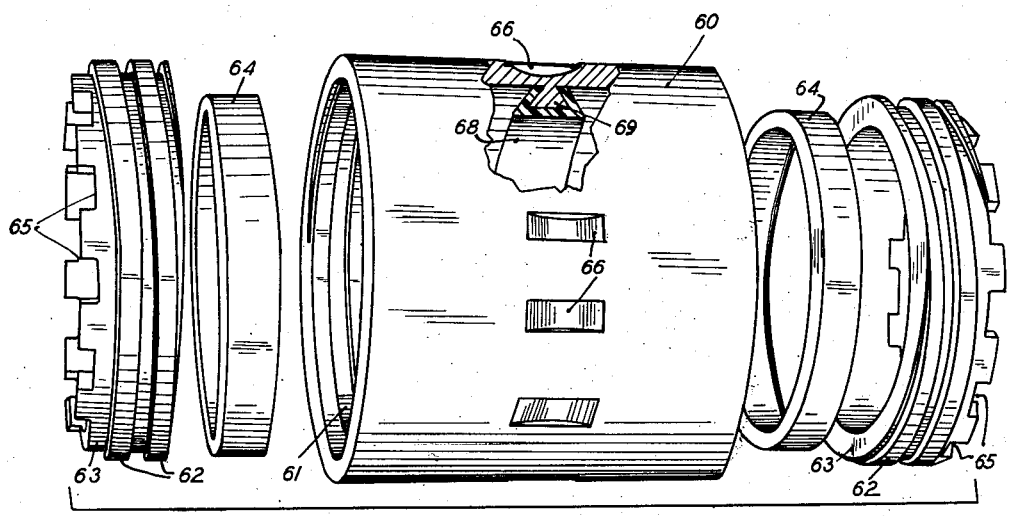
Fig. 7 is an exploded view of a further modification of the coupling.
Figure 8:
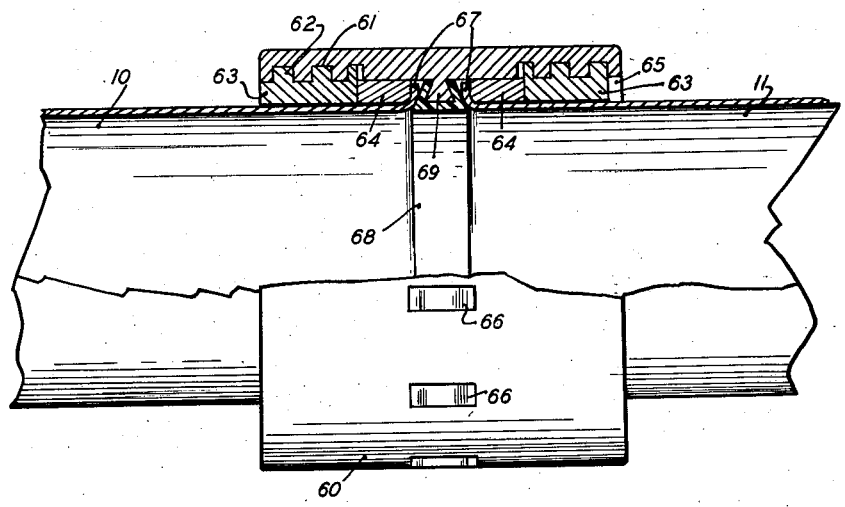
Fig. 8 is a view similar to Figs. 4, 5 and 6, showing the modification of Fig. 7 in assembled relation with the ends of a pair of pipe sections.

In Figs. 7 and 8 there is illustrated a further modification of the present invention in which a modified form of sleeve 60 is provided with internal threads 61 for engagement with external threads 62 on the exterior surfaces of modified gland nuts 63. The gland nuts engage short follower rings 64 which lie entirely within the sleeve, as do the gland nuts themselves. The outer ends of the gland nuts are castellated, as indicated at 65, so as to be engageable by suitable wrenches, and the central periphery of the sleeve 60 is provided with a series of depressions 66 extending circumferentially thereabout for engagement with a suitable wrench. It will be recognized that this construction achieves the same purposes as heretofore described, and is more rugged as well as less expensive. The castellated gland nuts and the depression-bearing sleeve may be cast in the shapes illustrated, employing less metal in a construction which is devoid of protrusions which might be broken off and which is sturdier as a result. The inner ends of the follower ring 64 are curved to fit into curved flanges 67 on the ends of the pipe sections, which flanges bear against a peripherally grooved gasket 68 mounted upon an undercut, central rib 69 on the interior surface of the sleeve 60, substantially as described and illustrated in Figs. 1 to 3 inclusive. However, it is to be appreciated that the modified forms of rib, gasket, flanges and follower rings illustrated in Figs. 4, 5 and 6 may be utilized in the presently illustrated form of the invention without departing from the invention.

Having illustrated and described several modifications of the present invention, it should be apparent to those skilled in the art that the same permits of other modifications in detail and arrangement. I claim as my invention all such modifications as come within the true spirit and scope of the appended claim.

I claim:

A conduit comprising a cylindrical sleeve having a central passage therethrough, an annular rib on said sleeve projecting radially inwardly from said sleeve into said passage, said rib having a side wall inclined inwardly from said sleeve at a constant radial inclination toward the adjacent end of said passage and terminating at a cylindrical inner wall, an annular elastomeric gasket mounted upon said rib having an annular side wall of constant thickness lying against said side wall of said rib and completely covering said side wall and a cylindrical inner side wall lying against said inner wall of said rib, a thin walled pipe section projecting axially into said passage from said adjacent end and terminating within said passage at a circumferentially continuous flange smoothly curved outwardly from said pipe section to project in a substantially radial direction from said pipe section, said flange having an outer diameter substantially equal to the internal diameter of said passage and said pipe section having an internal diameter substanially equal to the internal diameter of said inner side wall of said gasket and when in coupled relation with said sleeve and said rib forming an annular cavity adjacent the internal wall of said sleeve to provide an extrusion space for said gasket, a follower ring slideably mounted upon said pipe section and slideably received within said passage, said ring having an inner end face complementary in shape to said flange and engageable therewith, and a gland nut threadably received on said adjacent end of said sleeve engageable with said follower ring to drive said ring axially inwardly of said passage to clamp the radially outwardly curved portion of said flange in tangential sealing engagement with the radially inclined side wall of said gasket.

References Cited in the file of this patent

UNITED STATES PATENTS

| | | |
|---|---|---|
| 813,454 | Schaad | Feb. 27, 1906 |
| 923,890 | Puffer | June 8, 1909 |
| 1,707,904 | Dawson | Apr. 2, 1929 |
| 1,893,441 | Parker | Jan. 3, 1933 |
| 1,921,978 | Leary | Aug. 8, 1933 |
| 1,943,717 | Barnes | Jan. 16, 1934 |
| 1,948,211 | Fritz | Feb. 20, 1934 |
| 2,077,035 | Bredeson | Apr. 13, 1937 |
| 2,216,945 | Hinderliter | Oct. 8, 1940 |
| 2,454,567 | Pierson | Nov. 23, 1948 |
| 2,669,465 | Newell | Feb. 16, 1954 |
| 2,740,423 | Stillwagon | Apr. 3, 1956 |

FOREIGN PATENTS

| | | |
|---|---|---|
| 43,583 | Netherlands | Feb. 15, 1938 |